May 31, 1960   J. D. KERN ET AL   2,938,237
METHOD OF MAKING A GAME BALL
Filed May 2, 1957
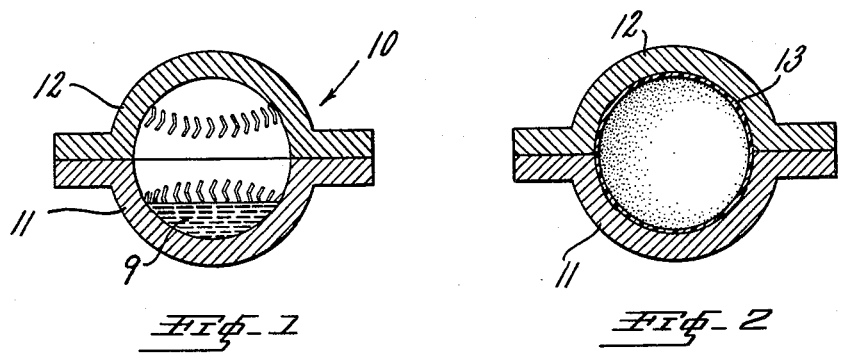
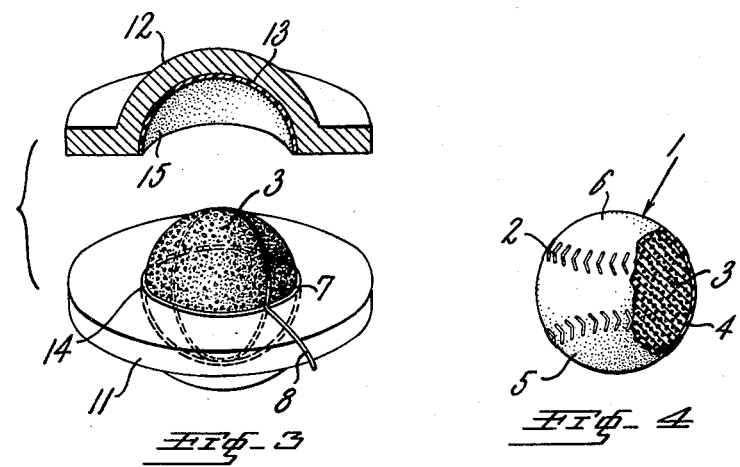
INVENTORS
JOHN D. KERN
ROBERT C. KOHRN
BY
ATTORNEY

United States Patent Office 2,938,237
Patented May 31, 1960

2,938,237

METHOD OF MAKING A GAME BALL

John D. Kern, South Bend, Ind., and Robert C. Kohrn, Pawtucket, R.I., assignors to United States Rubber Company, New York, N.Y., a corporation of New Jersey Filed May 2, 1957, Ser. No. 656,551

5 Claims. (Cl. 18—59)

This invention relates to a method of making game balls and more particularly to the application of a plastic covering over a centrally disposed core.

The ball to which the present invention relates is similar to the one shown in the United States Patent 2,743,931 to Pooley et al. It is a practice ball having a spherical core of closed-cell expanded plasticized polyvinyl chloride and a thin continuous surrounding outer shell of unexpanded plastic. This invention represents an improvement in the method of applying the outer shell described in that patent. The materials used in the invention, especially in the outer shell, are the same as those disclosed by Pooley.

In the method of applying the shell, the Pooley patent describes dipping or painting a preformed cellular core into a liquid plastisol, drying, refrigerating, and finally molding under pressure and heat. The main disadvantage in the method is that two or three coats of this "paint" are required in order to obtain the proper coating thickness. Inaccuracies in applying the coating develop in the method which affects the performance of the finished ball.

It is old in the art to apply an envelope over a core by first drawing a flat sheet of raw stock such as rubber or plastic into a female member so as to give it a hemispherical shape. A core is placed into one of the cup shaped or hemispherical members and covered with another. The two hemispheres are then adhered to each other by some adhesive or through vulcanization in a mold. In this type of operation, inasmuch as the sheets are more or less pre-cured, it is difficult to get a good adherence of the sheet to the core without the use of adhesives. Furthermore, the union of the two hemispheres forms a pronounced projecting rim which must be removed by a laborious cutting operation. This is so, since the sheets must have sufficiently large edges for holding while drawing the sheet into its hemispherical shape. Also, much scrap is produced in cutting sheets into the proper shape for drawing into hemispheres.

All the above described methods have one or more disadvantages which the present invention obviates. It is therefore the object of this invention to provide a method which is economical and which will produce a ball with a covering having a uniform wall thickness of plastic material.

In accordance with the invention, a two-piece mold is provided having an inside cavity corresponding with the outer surface of a desired ball. A measured quantity of a liquid mixture of vinyl resin in a plasticizer is enclosed in the mold and the mold rotated in a plurality of planes upon itself so that the material covers the interior of the mold to a uniform extent. Heat is applied during the rotating operation so as to cause the plastic to gel on the interior of the mold. The mold is then opened while hot, whereupon the deposited plastic shell separates into two hemispheres, separation taking place at the parting line of the two mold parts. The mold may be opened after cooling. A core of proper size is then dropped into one of the hemispheres, the mold again closed, and further heat applied until the plastisol hemispheres completely fuse together and integrally with the core.

In the method so far described, it is important that the mold be opened when the polyvinyl chloride plastisol has reached only the partially solvated or gelled state. At this point it is not pourable having the consistency of butter and is so tender that it cannot be removed as a hemisphere from within the mold part. However, it is this condition which allows the two hemispheres of polyvinyl to weld together at the seam line without the use of any substantial pressure. In effect, the use of pressure is completely eliminated in the molding process, except to keep the mold closed against the expansion of the core or internal gases during the heating steps. No pressure is required to make the fusing vinyl flow into the design etched in the mold surface.

During the final heating or fusing step, the escape of gases trapped between the core and the hemispherical shells frequently is apt to cause blisters in the finished cover. It was discovered that the trapped air can be removed or allowed to escape through a groove cut around a great circle of the core containing a thread or string if the core is placed into the mold so that the groove passes through "polar regions" of the mold parts while an end of the string hangs over the flange of a mold part. The gases, trapped between the shell covering and the core, exit by the way of the thread.

In the drawings:

Fig. 1 is a sectional view of the mold provided with a metered quantity of the liquid plastisol mixture;

Fig. 2 is a view of the mold of Fig. 1 after rotation and gelling of the deposition into a layer adhered to the surface of the mold;

Fig. 3 is a perspective view with a part in section showing the deposition layer or shell split into hemispheres and a core placed into one of the hemispheres with the thread end hanging over the mold flange; and Fig. 4 is a partly sectioned view of a game ball made according to the method of the invention.

As previously stated, this invention is primarily concerned with the shell or covering on a ball core, and it may be followed to produce balls of various sizes and shapes used in different games. The drawings illustrate a soft ball 1 with detail symbolizing stitching 2. As shown, it has an expanded closed cell core 3 covered by a non-cellular plastisol spherical shell or covering 4. Although the finished ball does not show any seam, the shell 4 comprises two hemispheres 5 and 6 that are united integrally together and to the core 3. The core can be made of any suitable material in any described manner, however, the core described in the Pooley et al. patent listed above is preferred.

In practicing the invention, a liquid mixture is first prepared by mixing polyvinyl chloride with a standard plasticizer for a resin of this type in a suitable container. An ether or ester plasticizer, for example, dioctyl phthalate, in an amount ranging from 30 to 80 parts of the plasticizer per 100 parts of polyvinyl chloride, suitable amounts of fillers, extenders, stabilizers, makes a suitable batch mixture. The batch, of course, should be agitated vigorously until a well dispersed resin in plasticizer mixture results.

A metered quantity 9 of the liquid from the batch is then deposited into a two-part mold 10 (Fig. 1) while the mold is open. The mold comprises two similar mold members 11 and 12 formed of some suitable metal such as cast aluminum. Each of the mold members 11 and 12 are practically identical in construction and are provided with hemispherical mold cavities which together, when the mold is closed, form a sphere of the desired ball size, The mold members 11 and 12 are held together by some suitable means such as bolts or clamps (not shown) when the mold is closed.

After the liquid mixture 9 is deposited into the mold 10 and the mold closed, the mold is then rotated continuously in various planes so that the material forms a uniform deposit or layer 13, Fig. 2, over the entire inner surface of the mold. It is set to a gel by heat supplied from an oven or chamber in which the rotation is conducted. A temperature of 430° F. is preferred, although any temperature above the gelation point of the particular vinyl plastisol is satisfactory. A rotation period of 4 to 5 minutes at the stated temperature is sufficient to gel to the consistency of butter the liquid necessary to produce the required one-eighth inch layer of about 131 grams weight typically used on a practice soft ball.

At the completion of the gelling, but before a substantial fusing of the vinyl has occurred, the mold is removed from the oven and opened while still hot. The gelled material or layer 13 tears easily along the parting line of the mold as it is opened, leaving both mold parts 11 and 12 coated with gelled, soft vinyl hemispheres 14 and 15.

A closed-cell blown cellular core 3 previously prepared as by the method described in the Pooley et al. patent is then provided with a great circle groove into which a thread 7 with a loose end 8 is set. The core is then inserted into one-half of the hot mold with the groove passing through the so-called "polar" region of the hemisphere and the loose thread end 8 of the thread 7 hanging over the flange of the mold part. The groove serves to bleed trapped air from the polar regions on the interior of the mold along the string or thread 7 and out of the mold by way of the loose end 8. This bleeding of trapped air is generally necessary, otherwise, on cooling, blistering of uneven adhesion between cover and core may result.

The mold parts 11 and 12 are again clamped closed, placed into the hot oven, and heated until complete fusion takes place. The vinyl hemispheres 14 and 15 heal completely along the tear line and produce a uniform unbroken spherical covering over and bonded to the core 3. Heating at a temperature of 430° F. for 9 minutes is preferred for a one-eighth inch thickness soft ball cover.

After the fusing period is completed, the mold is cooled, opened, and the ball removed. Submersion in water having a temperature of 100–110° F. for 28 seconds is preferred, although drenching with water or air cooling is satisfactory.

The thread end 8 and any flash which may be occasioned is then trimmed and the ball is then completed. Generally no flash results when the method is carried out with care.

While the process has been described with reference to making soft balls, it is suitable for making baseballs, golf balls, and the like. Slush molding procedures may be substituted for the casting process described; however, more accuracy and control over the shell thickness is obtainable by the casting operation. Furthermore, casting lends itself to cheaper mechanical operations by use of rotating apparatus such as shown in the Lawson et al. Patent 2,666,952. Although no particular apparatus for rotating the mold has been described, it is evident that any suitable apparatus can be used. A multiple cavity mold is equally suitable as the single cavity mold described. Also, the mold can be one that opens into more than two parts, for instance, three parts, as long as it splits the gelled layer into pieces that will readily enclose the core when assembled.

From the foregoing it is obvious that applicants have invented a simple and economical method whereby a plastisol shell may be applied over the ball core while avoiding any entrapment of air between the shell and the core. It makes possible the production of shell hemispheres and uniting them into integral units while avoiding the usual waste resulting from cutting discs and drawing them into shells of hemispherical shape.

Having thus described our invention, what we claim and desire to protect by Letters Patent is:

1. The method of covering a game ball with a cover made from a liquid mixture of vinyl resin and a plasticizer comprising, coating the surface defining a cavity in a separable mold with a layer of said mixture, heating said layer to a tacky gel, splitting said layer into parts by opening said mold, placing a preformed core on said layer in said mold, closing said mold and applying heat to fuse said layer parts together and with said core.

2. The method of covering a game ball with a cover made from a liquid mixture of a vinyl resin and a plasticizer comprising, depositing the mixture into the cavity of a separable mold, coating the cavity surface of said mold with a uniform layer of said mixture, heating said layer to a tacky gel, splitting said layer into hemispheres by opening said mold, placing a preformed spherical core into one of said hemispheres, closing said mold and applying further heat to fuse said hemispheres together and to said core.

3. The process of covering a game ball core with a cover made from a liquid mixture of vinyl resin and a plasticizer comprising, depositing said mixture into a spherical cavity of a separable mold, coating the surface defining the cavity in said mold with a layer of said mixture, heating said layer to a tacky gel, splitting said layer into hemispheres by opening said mold, depositing a split preformed spherical core having a porous string around its great circle into one of said hemispheres so that an end of said string hangs over the flange of said mold, closing said mold and applying additional heat to the closed mold to fuse said hemispheres together and integrally with said core, said porous string serving to bleed trapped air out of the mold between said core and said cover during the fusing step of the process.

4. The method of applying a cover made from a liquid mixture of vinyl resin and a plasticizer on a cellular core to form a ball, comprising the steps of depositing a measured charge of said mixture into the cavity of a separable mold, closing the mold with the charge retained therein, rotating the mold in a multiplicity of planes to distribute the charge as a layer covering the entire inner surface of the mold cavity, heating the mold until the mixture has gelled, splitting said layer into hemispheres by opening said mold, depositing a preformed spherical core into one of said hemispheres, closing the mold and applying additional heat to fuse said hemispheres together and integrally with said core.

5. A method of claim 3 wherein a porous string having a free end is embedded into the surface of said core and said core is deposited into one of said hemispheres so that the end of the porous string hangs over the flange of the mold and said porous string serves to bleed off trapped air between said core and said cover during the fusing step.

References Cited in the file of this patent

UNITED STATES PATENTS

| 2,035,774 | Trobridge et al. | Mar. 31, 1936 |
| 2,242,455 | De Beer | May 20, 1941 |
| 2,743,931 | Pooley et al. | May 1, 1956 |
| 2,763,028 | Blake | Sept. 18, 1956 |
| 2,812,551 | Chupa | Nov. 12, 1957 |